United States Patent
Aruga

(10) Patent No.: US 6,542,954 B1
(45) Date of Patent: Apr. 1, 2003

(54) DISK SUBSYSTEM

(75) Inventor: Kazuhisa Aruga, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/495,868

(22) Filed: Feb. 2, 2000

(30) Foreign Application Priority Data

Feb. 2, 1999 (JP) .......................................... 11-024648

(51) Int. Cl.$^7$ .......................... G06F 13/16; G06F 13/42
(52) U.S. Cl. ........................ 710/316; 710/315; 711/114
(58) Field of Search ........................ 711/114, 111, 112; 714/5, 6, 7; 710/11, 62, 65, 74, 38, 315, 316

(56) References Cited

U.S. PATENT DOCUMENTS

| | | | | |
|---|---|---|---|---|
| 5,077,736 A | * | 12/1991 | Dunphy, Jr. et al. | ............. 714/7 |
| 5,274,645 A | * | 12/1993 | Idleman et al. | ................. 714/6 |
| 5,471,586 A | * | 11/1995 | Sefidvash et al. | ........... 710/104 |
| 5,699,533 A | * | 12/1997 | Sakai | ......................... 710/316 |
| 5,729,763 A | * | 3/1998 | Leshem | ...................... 710/38 |
| 5,768,551 A | | 6/1998 | Bleiweiss et al. | ........... 710/316 |
| 5,867,640 A | * | 2/1999 | Aguilar et al. | ................. 714/6 |
| 6,148,414 A | | 11/2000 | Brown et al. | ................... 714/9 |
| 6,185,203 B1 | * | 2/2001 | Berman | ....................... 370/351 |
| 6,247,077 B1 | * | 6/2001 | Muller et al. | ................. 710/74 |
| 6,324,181 B1 | * | 11/2001 | Wong et al. | ................. 370/403 |

FOREIGN PATENT DOCUMENTS

JP            10171746            6/1998

* cited by examiner

Primary Examiner—Gary J. Portka
(74) Attorney, Agent, or Firm—Antonelli, Terry, Stout & Kraus, LLP

(57) ABSTRACT

A protocol controller disposed between switches in a fiber channel fabric switch circuit and disk drive units for converting a protocol to enable one-to-one connectivity established between controllers and disk drive units.

35 Claims, 7 Drawing Sheets

DISK SUBSYSTEM

BACKGROUND OF THE INVENTION

1. Field of the Invention

The present invention relates to an electronic device including a computer system incorporating a disk subsystem, a disk array, or a disk drive. The present invention also relates to a technology, which allows high-speed transfer by means of arrayed disks connected by a fabric switch.

2. Description of the Prior Art

In general, the connection between a disc controller device and a plurality of disk drives in a disk array may be achieved, as disclosed in the Jp-A No. 10-171746, by an SCSI interface or by a fibre channel arbitrated loop topology.

The SCSI interface, which uses a time-divided data transfer method on one signal line, negotiates with its initiator one to one for one moment on one signal line for an access.

The fibre channel arbitrated loop topology, on the other hand, may connect the initiator and disk drives in a loop by means of a serial interface, to enable time-division transfer of the data divided into frames to allow a number of communications with a plurality of devices at the same time and to allow up to 126 disk drive devices to be connected.

Disk drives will become more and more compact and higher density implementation thus will ultimately realize the use of more disk drive devices. Ideally the connection of a disk drive with its interface one to one should be implemented to enable a maximum transfer rate.

An SCSI interface in the Prior Art adopts a one-to-one data transfer scheme for one moment in one signal line. This may be a drawback if one wishes to implement simultaneous communications between an initiator and a plurality of disk drives. The number of connectable disk drive units in one bus is also limited to 7 or 15. When one connects a number of drive units for one-to-one negotiation on the SCSI interface, a plurality of interfaces are required, causing difficulty in counting. Because the number of the connectable disk drive units in one controller is so limited, one may encounter the necessity to add some further controller interfaces for connecting all units to a system.

When using a fibre channel, a plurality of disk drive units may be connected to a single controller. In a case where the controller and disk drive units may be connected by implementing a fibre channel fabric switch for switching the connectivity, a substantial one-to-one connection between the controller and the disk drive units may be implemented. Although the controller may support a fabric protocol for switching connection, generic disk drive units support only a fibre channel arbitrated loop (FC-AL) protocol but not the fabric protocol.

This resulted in that the switching connection may not be implemented, so that a loop connection had to be used with the FC-AL for sharing a same loop between plural disk drive units.

More specifically, a device (a controlling device in this context) which supports the fabric protocol has a World Wide Name (WWN), as its unique 24-bit address. The device may be logged in to the fibre channel fabric switch by using this unique address. A device (a disk drive unit) which supports only the FC-AL protocol but not the fabric protocol uses significant 16 bits in a same 24 bit address for verifying location within the loop and least 8 bits for the address AL-PA (Arbitrated Loop Port Address: each disk unit have a unique value in the loop) for logging in to a device (a controlling device managing the loop).

In such a loop connection, if the number of disk drive units connected in the same loop is increased, a data transfer rate of disk drive units may ultimately exceed beyond a maximum data transfer rate of the loop, resulting in that the data transfer in this loop may be limited to efficiency of the maximum data transfer rate of the loop. The data transfer rate in such a loop will be decreased to that in an equivalent SCSI interface.

SUMMARY OF THE INVENTION

The present invention has been made in view of the above circumstances and has an object to overcome the above problems and to provide a switch connection having a protocol converter for converting a protocol used between a disk drive unit and a controlling device to allow the disk drive unit and the controlling device to be connected one to one in a switching connection. For a switch having such a protocol converter, such as an FL_Port in accordance with an ANSI standard.

Additional objects and advantages of the invention will be according to part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The following description of a preferred embodiment of the present invention may be best understood by reading carefully with reference to the accompanying drawings, in which.

DETAILED DESCRIPTION OF THE PREFERRED EMBODIMENTS

Figure 1:
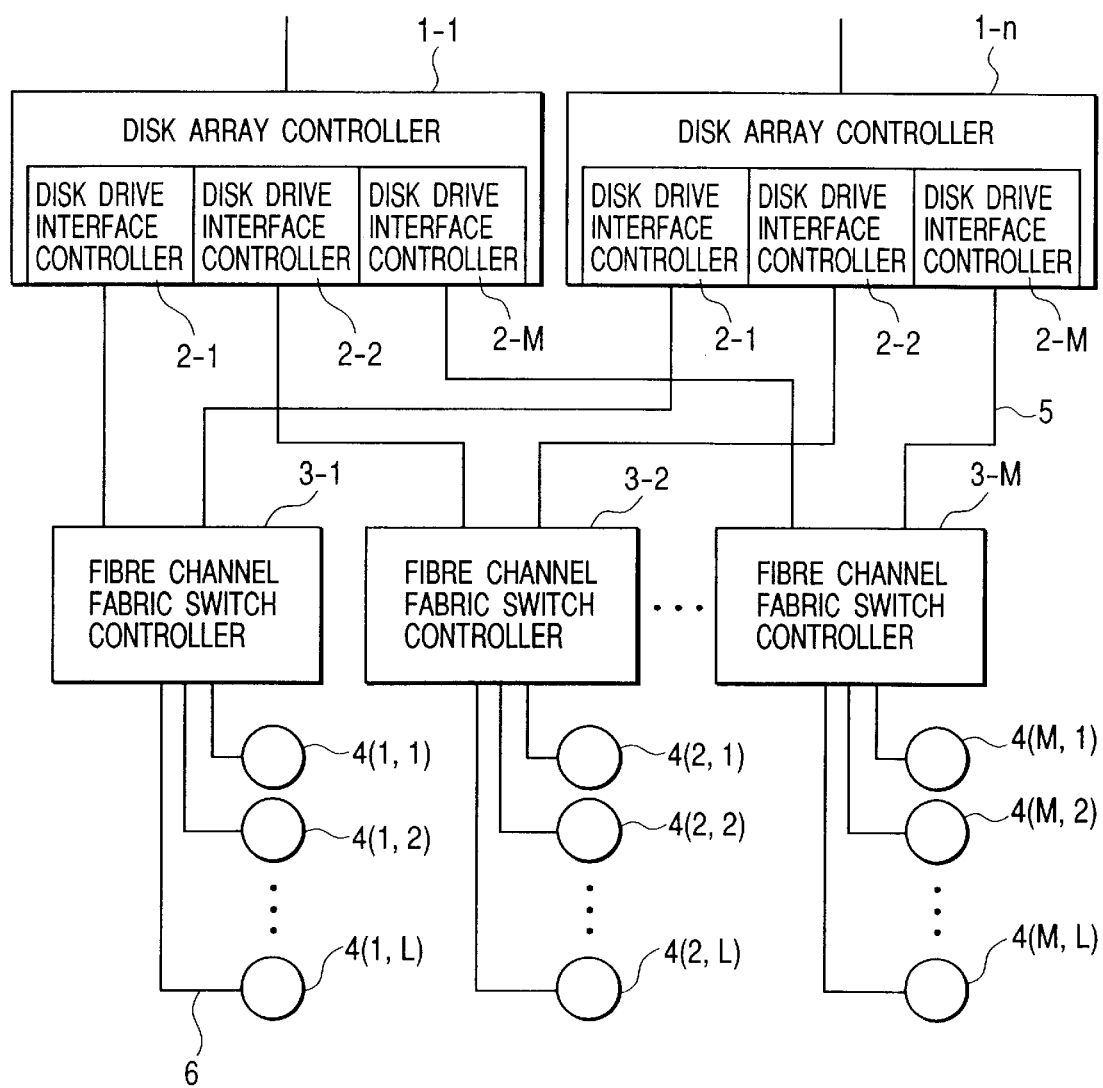
FIG. 1 is an overview of a preferred embodiment in accordance with the present invention.

A detailed description of a preferred embodiment of an external storage device (a disk subsystem) embodying the present invention will now be given referring to the accompanying drawings. FIG. 1 shows an overview of the device.

In the external storage device shown in the figure, N disk array controllers (controller section) 1-1 to 1-N (controllers in middle such as 1-2 are not shown, this applies to hereinbelow) are connected to a host computer (not shown) in an upper side, and provide M disk drive interface (disk drive I/F) controllers 2-1 to 2-M in a bottom side. The hardware configuration of the disk array controller will be described below in greater details. Each of M controllers of fibre channel fabric switch 3-1 to 3-M are respectively connected to the disk drive interface (I/F) controllers 2-1 to 2-M for controlling disk drive units through their fibre channel interface 5. L disk drive units are connected to one fibre channel fabric switch controller, a total of M by L disk drive units (4(1,1) to 4(M,L)) are connected to the fibre channel fabric switch controllers 3-1 to 3-M through fibre channel interfaces 6.

Each of disk drive interface controllers 2-1 to 2-M and disk drive units 4(1,1) to 4(M,L) has its unique identifier (ID number) for a loop protocol respectively. The fibre channel fabric switch controllers 3-1 to 3-M receive the ID numbers of the disk drive units to be connected from the disk drive interface controllers 2-1 to 2-M, to establish one-to-one connection between the corresponding disk drive interface controllers 2-1 to 2-M and the disk drive units 4(1,1) to 4(M,L).

Figure 2:
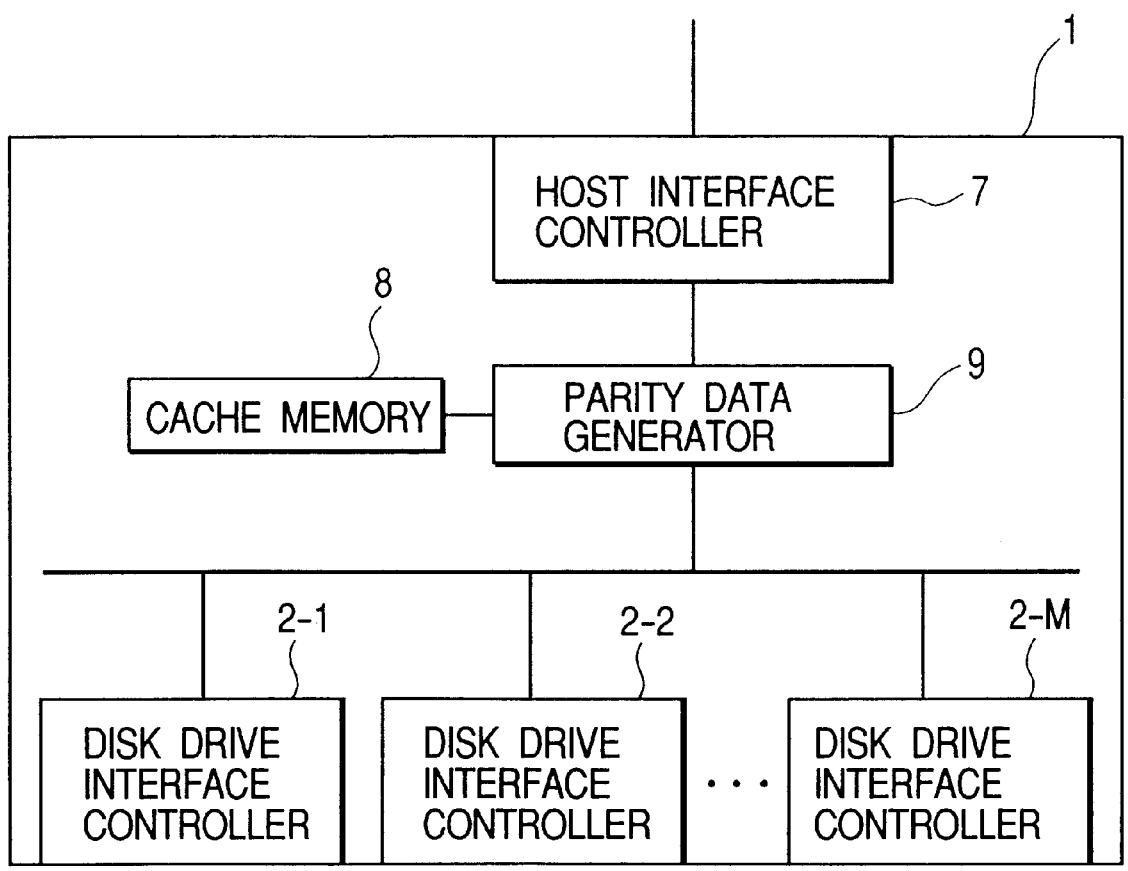
FIG. 2 is a schematic detailed block diagram of a disk array controller.

FIG. 2 shows a hardware configuration of the disk array controllers 1-1 to 1-N. Data transferred there to from the host computer (not shown) is temporarily stored in a cache memory controlled by a host interface controller 7 so as to be added with parity data by a parity data generator 9, then to be split into (a total of M segments of) data blocks and parity data block(s). These data block sand parity block (s) will bestored to a respective disk drive group (not shown) by the disk drive interface controllers 2-1 to 2-M, which are corresponding interfaces.

To transfer data to the host computer (not shown), if there is data to be transferred thereto in the cache memory 8, then the data in the cache will be transferred to the host by the host interface controller 7. If the data to be transferred to the host is not in the cache memory 8 then the disk drive interface controllers 2-1 to 2-M will read split data segments out of the disk drive group, concatenate split data segment blocks in the parity data generator 9, and store the complete data temporarily in the cache memory 8, and the host interface controller 7 will transfer the data to the host.

The foregoing embodiment depicts a data storage method in a case of a RAID system. However data may also be stored without the RAID system. Without the RAID system, parity data generator 9 does not exist. The data transferred from the host (not shown) are temporarily stored in the cache memory 8 and then written to any one of disk drive units in the disk drive group. When mirroring a same data will be written into the plural disk drive units. For reading out, the data will be read out of the disk drive units, stored temporarily in the cache memory 8 and the host interface controller 7 will transfer to the host.

It should be noted that in the following description, another embodiment of disk subsystem using the RAID system will be described, however the embodiment may equivalently be made without using the RAID system.

Figure 3:
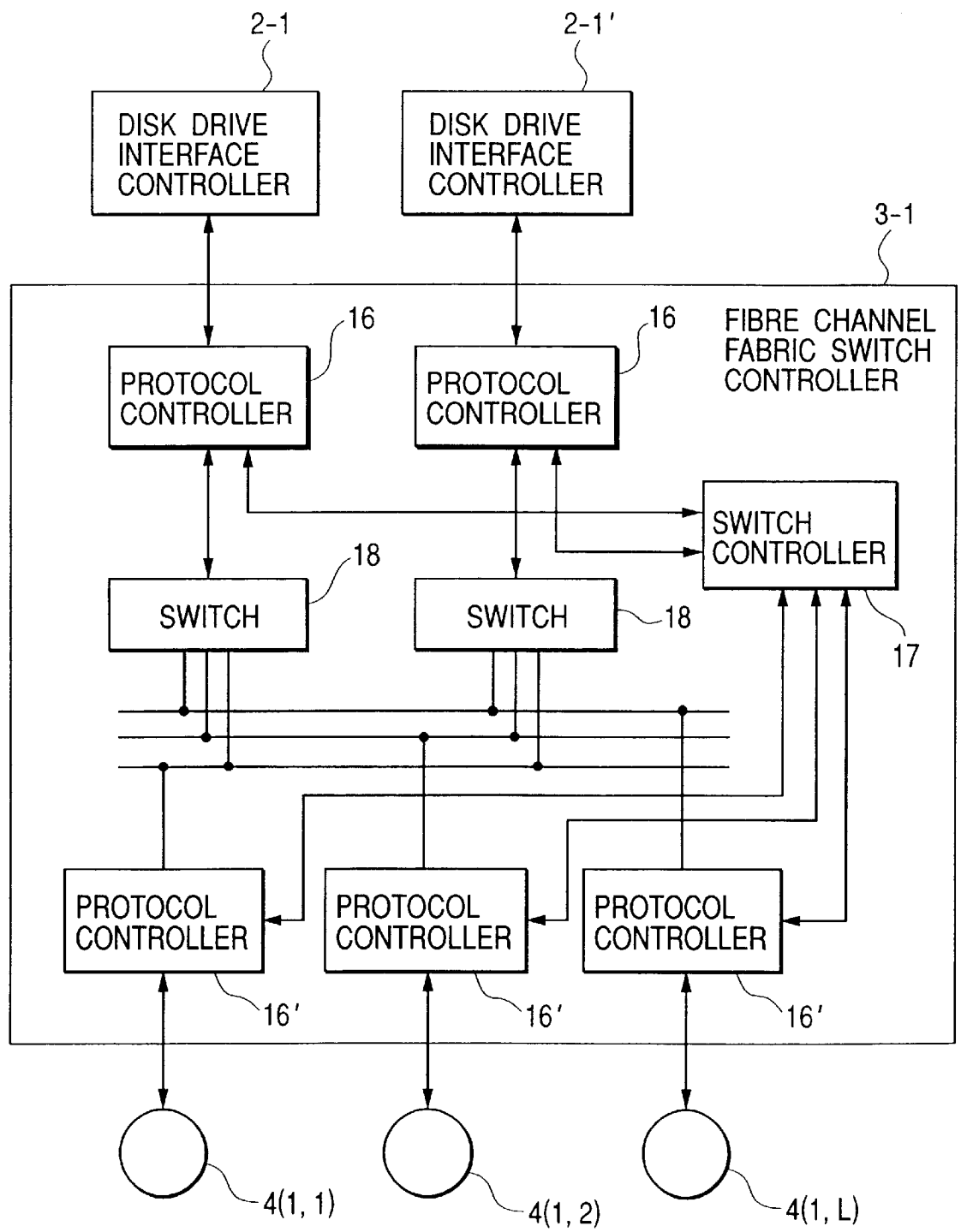
FIG. 3 is a schematic detailed block diagram of a fibre channel fabric switch controller.

FIG. 3 shows a hardware configuration of the fibre channel fabric switch controllers 3-1 to 3-M. A protocol controller 16 (a first protocol controller) connected to the disk drive interface controller 2-1 detects ID number of the disk drive units 4(1,1) to 4(1,L) to be accessed and controls a fibre channel protocol used. A protocol controller 16' (a second protocol controller) connected to the disk drive units 4(1,1) to 4(1,L) allocates a new ID number for a fabric protocol of the disk drive units 4(1,1) to 4(1,L) to the ID number for the loop protocol specific to the disk drive units 4, in order to report to a switch controller 17 the ID number of disk drive units 4(1,1) to 4(1,L) in charge. The switch controller 17, which maintains the ID numbers for these protocols of the disk drive units 4(1,1) to 4(1,L) by using for example a table, may set the switch 18 based on the ID number (fabric protocol) received from the disk drive interface controllers 2-1 to 2-M so as to establish the one-to-one connection.

In other words the switch controller 17 sets the corresponding 24-bit WWN address used in the fabric protocol to each of disk drive units 4 as a new ID number. Then the switch controller 17 may use a table to attempt to correspond the ID number for the loop protocol with the newly set ID number for the loop protocol. By corresponding the IDs the disk drive interface controller may establish a connection to the disk drive unit 4 by using the newly set ID number. In this specification this coordination of ID numbers may also be referred to as a protocol control or a protocol conversion.

In addition, the protocol control may be set so as to be performed in the protocol controller 16', or may be set so as to switch the protocol controller 16 with the protocol controller 16' for the data transfer from the host computer and for the data transfer to the host, or for the data transfer for a normal operation and for the data transfer for an operation in a disk failure.

Another configuration may also be used in which one of the protocol controller 16 and the protocol controller 16' is used, in such a case an ID number detector means may be provided instead of the protocol controller 16, or an ID number allocating means may be provided instead of the protocol controller 16'.

Alternatively, a protocol controller and switches may be provided within the disk drive interface controllers 2-1 to 2-M to allow direct connection to the disk drive units 4(1,1) to 4(1,L), instead of proprietary fibre channel fabric switches provided independently in the system.

Figure 4:
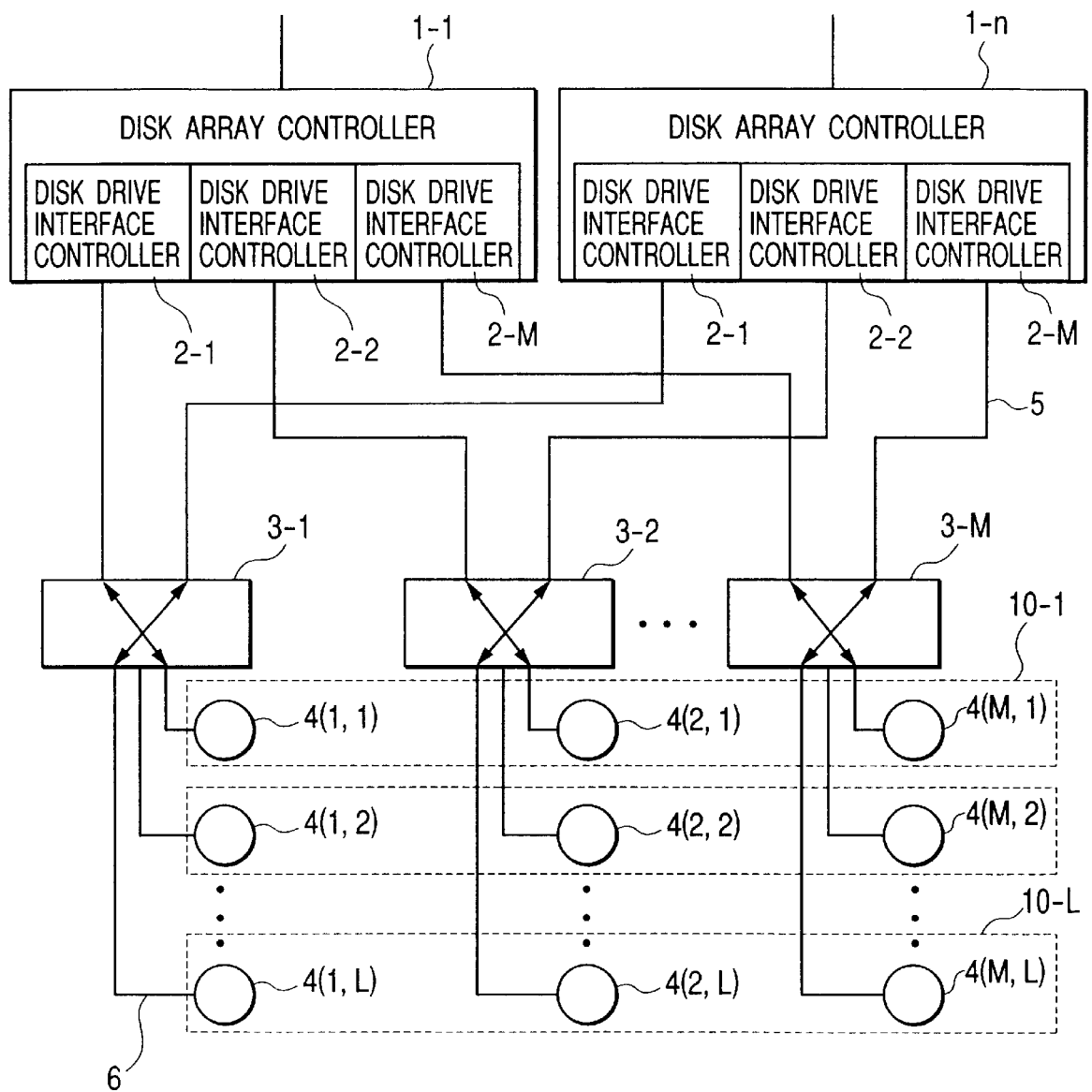
FIG. 4 is a schematic block diagram of a fibre channel fabric switch.

FIG. 4 shows an operation of the fibre channel fabric switch controllers 3-1 to 3-M.

The disk array controller 1-1 stores data split to M segments into a disk drive group 10-1. The disk drive interface controllers 2-1 to 2-M in the disk array controller 1-1 send the ID number of disk drive units belonging to the disk drive group 10-1 to the fibre channel fabric switch controllers 3-1 to 3-M so as to establish a switching. The protocol controller 16 in the fibre channel fabric switch controllers 3-1 to 3-M (see FIG. 3) detects the ID number sent to request the switch controller 17 to switch the switch connection in order to achieve the protocol control pertinent to the disk drive units.

The switch controller 17 (see FIG. 3) switches a switch 18 (see FIG. 3) so as to connect the disk array controller 1-1 requesting connection to the requested disk drive unit 4 belonging to the disk drive group 10-1.

It should be recognized that since the disk array controller 1-1 is correspondingly connected to one disk drive group 10-1 through the fibre channel fabric switch controllers 3-1 to 3-M another disk array controller 1-N and the disk drive group 10-2 may separately perform another data transfer without interference. When the disk array controller 1-N establishes a connection to the disk drive group 10-L, the connection between the disk array controller 1-1 and the disk drive group 10-1 and the connection between the disk array controller 1-N and the disk drive group 10-L can operate separately from each other to perform the data transfer at a maximum data transfer rate possible between each disk array controller and respective disk drive unit.

Although not described in this specification the switch controller 17, when switching the connection as have been described above, may effectively maintain the maximum transfer window by switching the connection of the switch 18 upon reception of signals indicating that the disk drive unit connected thereto becomes ready to read/write at a time of data read or data write.

Figure 5:
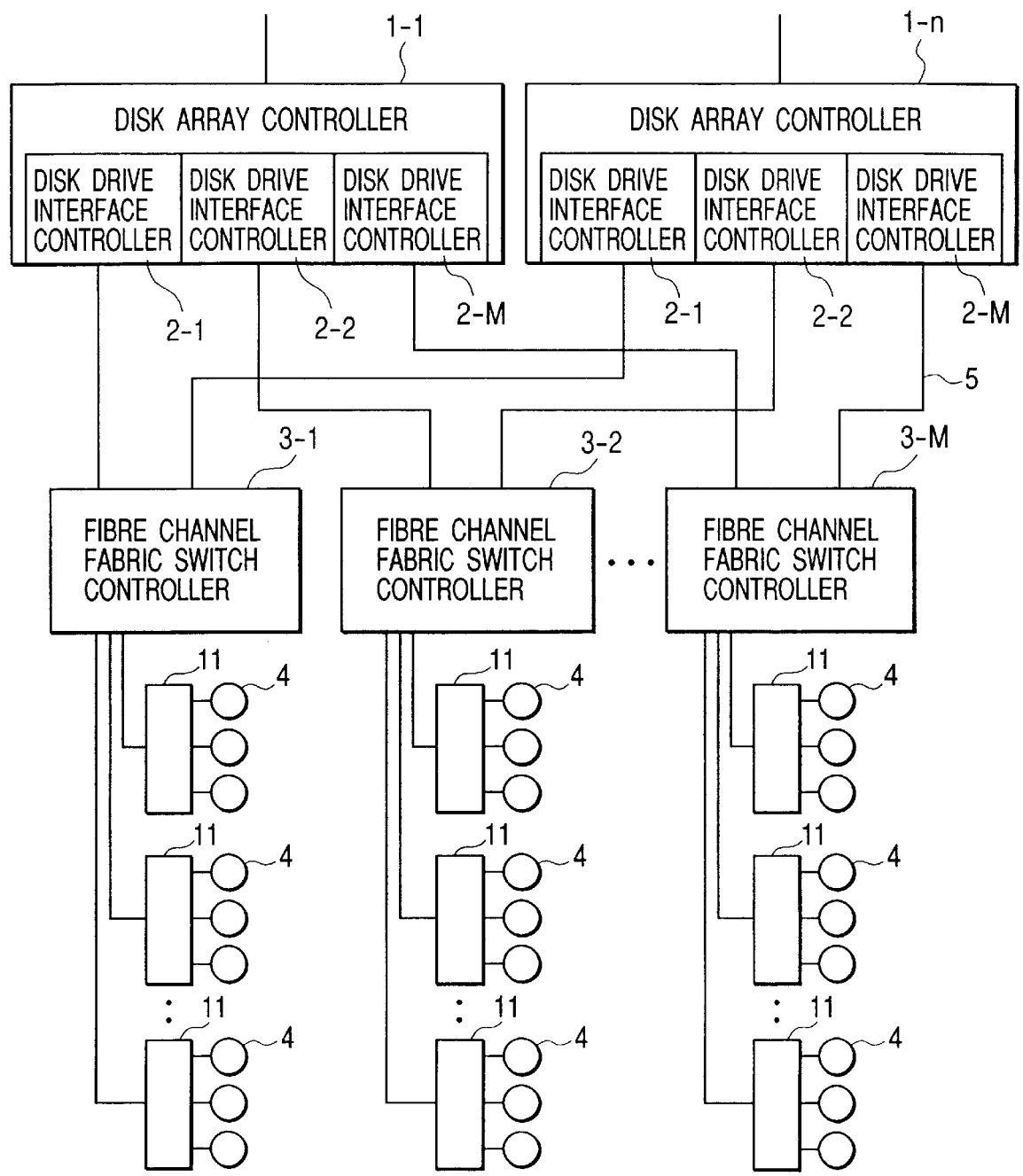
FIG. 5 is a schematic block diagram of a fibre channel fabric switch and an arbitrated loop.

FIG. 5 shows another extended embodiment in accordance with the present invention. In the embodiments above, the protocol controller 16 in a fibre channel fabric switch controller 3 was connected one to one to the disk drive unit 4. In the present embodiment however, a same section is configured such that the protocol controller 16 is connected in loop to the plural disk drive units 4 through a fibre channel arbitrated loop controller 11. In this manner, an array of a plurality of inexpensive disk drive units 4 may operate at the performance level equivalent to an expensive large disk drive unit of the same capacity. In this configuration not all disk drive units are connected in loop. Apparently the fibre channel arbitrated loop controller 11 and the plural disk drive units 4 form the single disk drive unit 4. The performance of accessing will not be degraded.

Although not shown in the figure, if the maximum data transfer rate of the fibre channel interface is enough higher with respect to the accessing speed of disk drive, the number of disk drive units 4 may be increased without aggravation of access performance, by connecting the plural disk drive units 4 to the fibre channel arbitrated loop controller 11, by connecting the plural disk drive units in a same loop, and by sharing the maximum transfer rate of the fibre channel with the plural disk drive units 4.

Figure 6:
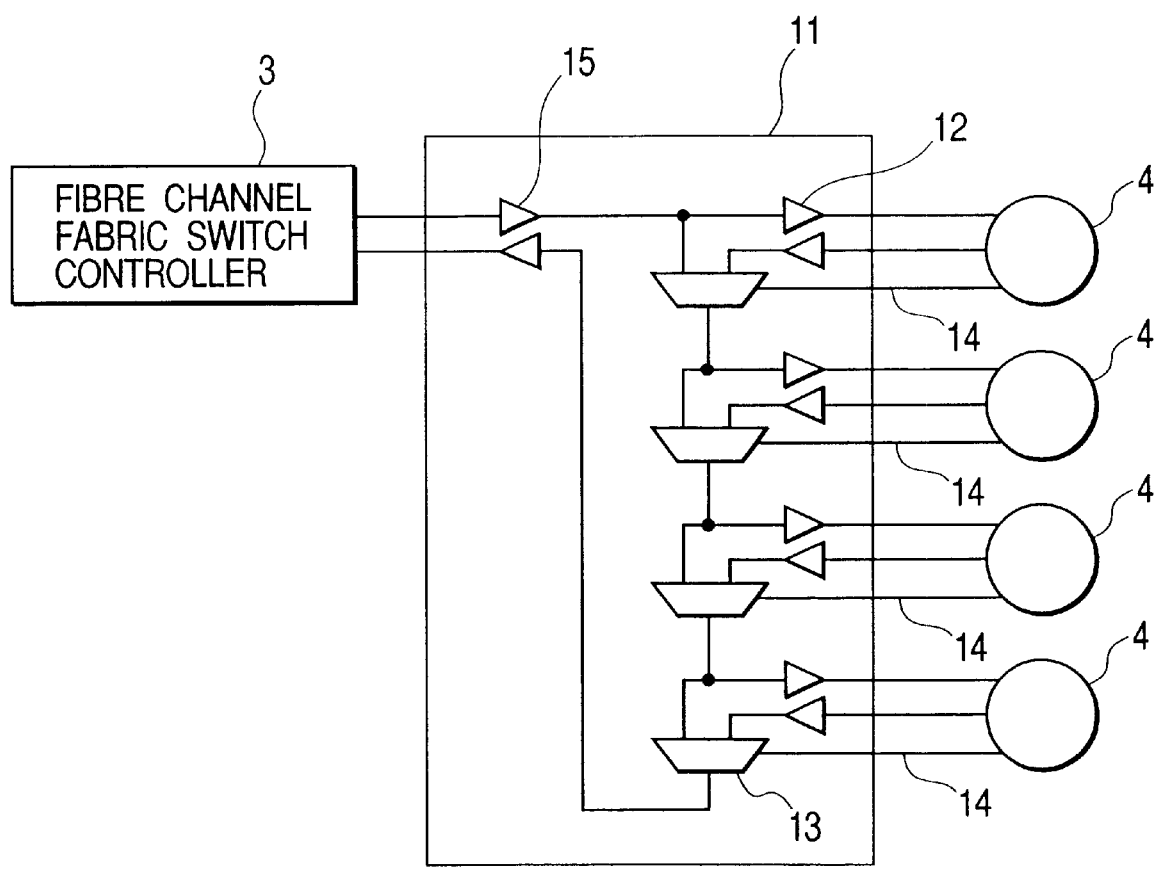
FIG. 6 is a schematic detailed block diagram of a fibre channel arbitrated loop controller.

FIG. 6 shows a hardware configuration of the fibre channel arbitrated loop controller 11 used for the embodiment shown in FIG. 5.

A fibre channel arbitrated loop controller 11 comprises a loop bypass circuit 13, a plurality of disk drive unit attaching ports 12, and a fabric switch connector port 15. From disk drive units 4 loop bypass circuit switching signal 14 is output, allowing ports to be bypassed in case of failure, in order to enable hot swapping of disks. More specifically, loops will keep alive, other operating disks will not be affected, and the failed disk drive unit can be detached and/or new disk drive units can be added.

Figure 7:
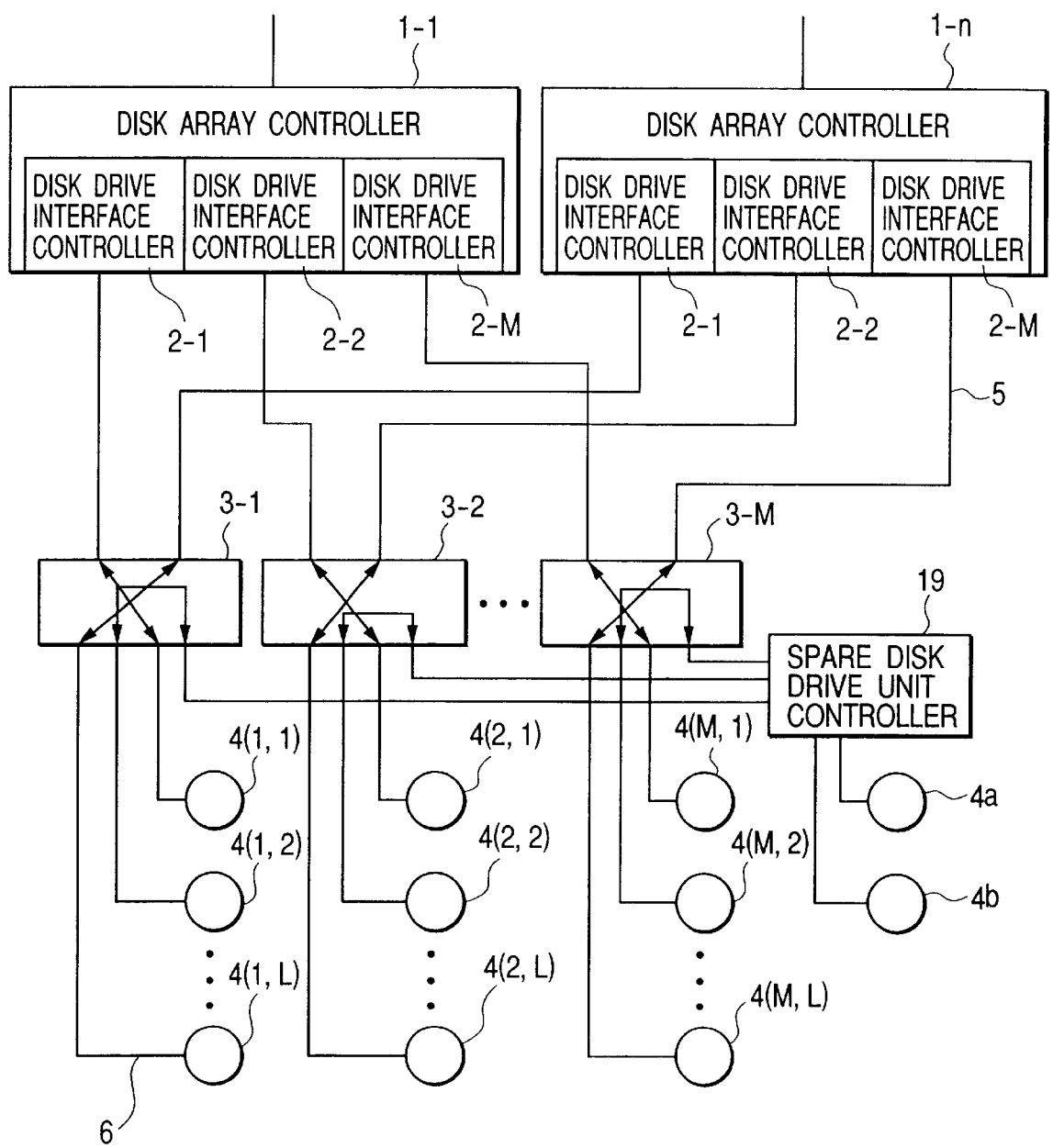
FIG. 7 is a schematic detailed block diagram of a spare disk drive unit controller.

FIG. 7 shows another extended embodiment in accordance with the present invention.

The present embodiment comprises spare disk drive unit controllers 19 each connected to respective fibre channel fabric switch controllers 3-1 to 3-M, a plurality of spare disk drive units 4-a and 4-b each connected to the spare disk drive unit controllers 19. The spare disk drive units 4-a and 4-b are provided in common to all (disk drive units connected to) switch controller circuits. These spare disk drive units 4-a and 4-b may be either connected in loop to a spare disk drive unit controllers 19, or switched.

Within the fibre channel fabric switch controller 3, the protocol controller 16, (see FIG. 3) connected to a disk drive group having a failed disk drive unit 4 (in the figure the disk drive unit 4(1,2)) may be connected to the spare disk drive unit controllers 19 through the switch controller 3-1.

If a disk drive unit is not operating well, the disk array controller 1-1 to 1-n attempts to rebuild the data structure in the spare disk drive unit 4-a or 4-b. When a specific disk drive unit 4 has so many operational errors that a failure of disk drive unit mechanism is forecasted, the array controller 1-1 picks up and copies data stored in the malfunctioning disk drive unit 4 to a spare disk drive unit 4-a or 4-b and rebuilds the disk array.

The switch controller of the present embodiment then has an internal configuration or layout of a switch 18' slightly different from the switch controllers as described in the preceding embodiments so as to enable input from the disk drive units to be output to the disk drive units 4. For example, another switch 18' may be provided between the protocol controller 16' and the switch 18 to determine according to the request from the spare disk drive unit controller 18 whether the output from the disk drive units is routed to the switch 18 or routed to another protocol controller 16'.

If a disk drive unit fails and the data stored therein cannot be read out, lost data may be reconstructed in the cache memory 8 and parity data generator 9 in the disk array controller 1 from the data stored in the other disk drive units of the same disk drive group as the failed disk drive unit 4 to rebuild the data into the spare disk drive unit 4-a or 4-b.

It should be noted that the switch controller 3 identical to the preceding embodiments may be used because the disk array controller 1 may be served for the data recovery when the data stored in an erroneous disk drive unit 4 is copied to a spare disk drive unit.

In addition, the spare disk drive unit controllers 19 may be independently served for the data recovery from a failed disk drive unit. To do this, cache memory and parity data generator should be provided in the spare disk drive unit controllers 19. The spare disk drive unit controllers 19 may read out data from the disk drive units other than the failed unit in the same group to regenerate the lost data segments and store thus generated data in a spare disk drive unit 4-a or 4-b.

The data recovery without affecting to the data access operation from the host computer may be achieved by performing access operation to the spare disk drive unit controllers 19 from the failed disk drive unit 4 or from other disk drive units storing split data including the parity for the recovery of errors, independently of the data access operation between the disk drive units 4 (disk drive group comprising disk drive units 4(1,1) to 4(1,L) in the figure) and the host computer via the disk array controllers 1-1 to 1-N.

In a similar manner, when a failed disk drive unit has been hot-swapped with a disk drive unit off the shelf, the recovery of failed unit may be achieved without affecting any to access from the host, as the spare disk drive unit controller 15 may establish one-to-one connection for the fibre channel fabric switch controllers 3-1 to 3-M, switched from the spare disk drive units 4-a and 4-b to a healthy disk drive unit newly hot-swapped with a failed disk drive unit, to perform data copy/recovery independently of the access from the disk array controller 1-1 to 1-N to the disk drive group 10-1 to 10-L (see FIG. 4).

The present invention provides the connectivity of the plural disk drive units to a disk drive unit interface without compromising the transfer performance by using the fibre channel interface, which is a scheme of serial interface, and by applying a fibre channel fabric topology, which allows hot swapping of connectivity. The present invention further provides a solution of controlling the plural disk drive units with one or a few disk drive unit controllers, by hot-swapping the connectivity for each controller and disk drive group. In addition, the present invention provides improved reliability of the system by performing the operation of data recovery in case of disk drive unit failure, independently of the data transfer between the disk drive interface controllers and the disk drive units.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. it is intended that the scope of the invention be defined by the claims appended hereto, and their equivalents.

What is claimed is:

1. A disk subsystem, comprising:
    a disk array controller,
    wherein said disk array controller comprises:
        a host interface controller for controlling data input/output from a host computer,
        a cache memory for temporarily storing data received in said host interface controller,
        a parity data generator for adding parity data to said data, and
        disk drive unit interfaces for storing said data into a plurality of disk drive units for storing said data and said parity data;
    fabric switches provided between said disk array controller and said disk drive units,
    wherein each fabric switch comprises:
        first protocol controllers connected to said disk drive unit interfaces for detecting an ID number of a loop protocol of one of said disk drive units to be accessed,
        second protocol controllers connected to said disk drive units for allocating an ID number of a fabric protocol to one of said disk drive units, and
        a switch controller provided between said first protocol controllers and said second protocol controllers for storing both ID numbers of each of said disk drive units to store correspondence of said both ID numbers.

2. A disk subsystem according to claim 1, wherein fibre channels are used for connecting said disk array controller with said disk drive units.

3. A disk subsystem, comprising:
    a disk array controller for transferring data from a host computer to a plurality of disk drive units;
    a switch for connecting said disk array controller and said plurality of disk drive units,
    wherein said switch comprises:
        a first protocol controller connected to said disk array controller for receiving ID number of the disk drive unit to be accessed in said plurality of disk drive units;
        a second protocol controller connected to said plurality of disk drive units for giving ID numbers to said plurality of disk drive units, and
        a switch controller connected to said first protocol controller and said second protocol controller for comparing said ID number received from said first protocol controller with said ID numbers of said plurality of disk drive units given by said second protocol controller,
    wherein the first protocol and the second protocol are different.

4. A disk subsystem according to claim 3, wherein a protocol used between said disk array controller and said switch is a fabric protocol.

5. A disk subsystem according to claim 3, wherein said plurality of disk drive units connected to said switch forms an arbitrated loop.

6. A disk subsystem according to claim 5, wherein said arbitrated loop is formed for a predetermined number of disk drive units.

7. A disk subsystem according to claim 6, wherein a loop path of said arbitrated loop comprises:
    a switch connection connected to said switch;
    a disk drive connection connected to a predetermined number of said disk drive units and provided for said predetermined number of said disk drive units; and
    a loop bypass circuit provided for said predetermined number of disk drive units for detaching a disk drive unit or for adding a disk drive unit according to a signal output from said predetermined number of disk drive units.

8. A disk subsystem according to claim 3, wherein said switch is a fiber channel fabric switch connected to said plurality of disk drive units.

9. A disk subsystem according to claim 3, wherein a protocol used between said switch and said plurality of disk drive units is a fiber channel arbitrated loop protocol.

10. A disk subsystem according to claim 3, wherein a fiber channel arbitrated loop topology is applied between said disk array controller and said switch.

11. A disk subsystem according to claim 3, wherein a fiber channel arbitrated loop topology is applied between said switch and said plurality of disk drive units.

12. A disk subsystem according to claim 3, wherein said first protocol controller performs connection between the protocol of said disk array controller and the fabric protocol of said switch.

13. A disk subsystem according to claim 3, wherein said second protocol controller performs connection between the fabric protocol of said switch and the protocol of said plurality of disk drive units.

14. A disk subsystem according to claim 3, wherein said first protocol controller performs connection between the protocol of said disk array controller and the protocol of said disk drive units when data obtained from said host computer are transferred to said disk drive units, and
    wherein said second protocol controller performs connection between the protocol of said disk drive units and the protocol of said disk drive array controller when data obtained from said host computer are transferred to said disk drive units.

15. A disk subsystem according to claim 3, wherein said disk array controller comprises:
    a plurality of disk drive interfaces for writing data transferred from said host computer to said plurality of disk drive units,
    wherein said first protocol controller comprises:
        a plurality of first protocol controllers connected to said plurality of disk drive interfaces,
        wherein said switch controller receives ID numbers of said plurality of disk drive units from said plurality of first protocol controllers.

16. A disk subsystem according to claim 3, wherein said disk array controller comprises:
    a plurality of disk array controllers,
    wherein said disk array controller comprises:
        a plurality of disk drive interfaces for writing data transferred from said host computer to said plurality of disk drive units.

17. A disk subsystem according to claim 16, wherein said first protocol controller comprises:
    a plurality of first protocol controllers connected to said plurality of disk drive interfaces, wherein said switch controller receives ID numbers of said plurality of disk drive units from said plurality of first protocol controllers.

18. A disk subsystem according to claim 3, wherein said switch comprises:
   a plurality of switches,
   wherein plural sets of said plurality of disk drive units are provided to said switches.

19. A disk subsystem according to claim 18, wherein said plurality of disk drive units forms an arbitrated loop having a predetermined number of disk drive units for each switch of said plurality of switches.

20. A disk subsystem according to claim 19, wherein a loop path of said arbitrated loop comprises:
   a switch connection connected to said switch;
   a disk drive connection connected to said plurality of disk drive units and provided for each of said plurality of disk drive units; and
   a loop bypass circuit provided for each of said plurality of said disk drive units for detaching a disk drive unit or for adding a disk drive unit according to a signal output from said plurality of disk drive units.

21. A disk subsystem according to claim 3, wherein said second protocol controller comprises:
   a plurality of second protocol controllers,
   wherein switch controller memory ID numbers of said plurality of disk drive units are given by said plurality of second protocol controllers.

22. A disk subsystem according to claim 3, wherein said second protocol controller comprises:
   a plurality of second protocol controllers,
   wherein plural sets of said plurality of disk drive units are provided to said second protocol controller.

23. A disk subsystem according to claim 22, wherein said disk drive units forms an arbitrated loop having predetermined numbers of disk drive units for each of said plurality of second protocol controllers.

24. A disk subsystem according to claim 23, wherein a loop path of said arbitrated loop comprises:
   a switch connection connected to said switch;
   a disk drive connection provided for each of said plurality of disk drive units and connected to said plurality of disk drive units; and
   a loop bypass circuit provided for each of said plurality of said disk drive units for detaching a disk drive unit or for adding a disk drive unit according to a signal output from said plurality of disk drive units.

25. A disk subsystem according to claim 3, wherein said disk array controller comprises:
   a plurality of disk array controllers,
   wherein said plurality of disk drive units forms a disk drive group to each of predetermined number of disk drive units, and
   wherein said switch controller controls a first disk array controller of said plurality of disk array controllers so as to be able to access to a first disk drive group during accessing a second disk array controller of said plurality of disk array controllers to a second disk drive group.

26. A disk subsystem according to claim 3, wherein said disk array controller comprises:
   a plurality of disk array controllers,
   wherein said plurality of disk drive units forms a disk drive group to each of predetermined number of disk drive units, and
   wherein said switch controller controls a connection between a first disk array controller of said plurality of disk array controllers and a first disk drive group, and a connection between a second disk array controller of said plurality of disk array controllers and a second disk drive group independently.

27. A disk subsystem according to claim 3, wherein said disk array controller comprises:
   a plurality of disk array controllers,
   wherein said plurality of disk drive units forms a disk drive group to each of a predetermined number of said plurality of disk drive units, and
   wherein said switch controller controls so as to be able to access a first disk array controller of said plurality of disk array controllers to a first disk drive group, and access a second disk array controller of said plurality of disk array controllers to a second disk drive group simultaneously.

28. A disk subsystem according to claim 3, wherein said switch controller connects a disk drive unit which is in a condition for reading or writing to said disk array controller according to a signal showing one of said plurality of disk drive units in a condition for reading or writing.

29. A disk subsystem according to claim 3, wherein said plurality of disk drive units comprises:
   a spare disk drive unit for use as a spare,
   wherein said subsystem, connected to said switch, comprises:
      a spare disk control circuit for building data into said spare disk drive unit,
      wherein said spare disk control circuit transfers said data stored in a disk drive unit having a potential of a failure to said spare disk drive unit when a failure of one of said plurality of disk drive units is forecasted.

30. A disk subsystem according to claim 3, wherein said plurality of disk drive units comprises:
   a spare disk drive unit for use as a spare,
   wherein said plurality of disk drive units except for said spare disk drive forms disk drive groups for a predetermined number of disk drive units,
   wherein said disk subsystem connected to said switch comprises:
      a spare disk control circuit for building data into said spare disk drive unit,
      wherein said spare disk control circuit rebuilds data stored in a disk drive unit having trouble based on data stored in a disk drive group including a disk drive unit having a failure when any one of said plurality of disk drive units have some trouble, and write said rebuilt data into said spare disk drive unit.

31. A disk subsystem according to claim 30, wherein said disk array controller comprises:
   a first cache memory for storing temporary data transferred from said host computer; and
   a first parity data generator for adding parity data to said data transferred from said host computer,
   wherein said spare disk control circuit stores data stored in said disk drive group including said disk drive unit having said trouble into said first cache memory temporarily, and said first parity data generator rebuilds data stored in said disk drive unit having trouble based on said stored data in said first cache memory.

32. A disk subsystem according to claim 30, wherein said spare disk control circuit comprises:

a second cache memory for storing temporary data stored in a disk drive group including a disk drive unit having a failure; and a second parity data generator for rebuilding data stored in a disk drive unit having a failure based on said data stored in said second cache memory, wherein said data stored in said disk drive group including said disk drive unit having the failure is stored in said second cache memory temporarily, and said data stored in said disk drive unit having the failure is rebuilt in said second parity data generator based on said data stored in said second cache memory.

33. A disk subsystem according to claim 3, wherein said second protocol controller comprises:

a plurality of second protocol controllers, wherein said plurality of disk drive units comprises:

a spare disk drive unit for use as a spare, wherein said plurality of disk drive units except for said spare disk drive unit forms a disk drive group for a predetermined number of disk drive units, wherein said subsystem connected to one of said plurality of second protocol controller comprises a spare disk controller for building data into said spare disk drive unit, and wherein said switch controller performs connection between one of said second protocol controllers connected with a disk drive group including a disk drive unit having a trouble and the other of said second protocol controllers connected with said spare disk control circuit.

34. A disk subsystem according to claim 14, wherein said plurality of disk drive units comprises:

a spare disk drive unit for use as a spare, wherein said plurality of disk drive units except said spare disk drive forms a disk drive group for a predetermined number of disk drive units, wherein said subsystem connected to said switch comprises:

a spare disk control circuit for building data into said spare disk drive unit, and wherein said switch controller connects a first disk drive group including a disk drive unit having trouble with said spare disk control circuit in case that said disk array controller is connected to a second disk drive group, when any one of said plurality of disk drive units have some trouble.

35. A disk subsystem according to claim 34, wherein said switch controller connects a second disk drive group includes of normal disk drive units to said spare disk control circuit in case that said disk array controller is connected to said first disk drive group, when said disk drive units which caused trouble are replaced with said normal disk drive units.

* * * * *